United States Patent Office 3,245,987
Patented Apr. 12, 1966

---

3,245,987
Δ⁴,⁶-3-ONE-6-ALKYL PREGNANE STEROIDS AND PROCESSES FOR PREPARING THEM
Arthur E. Erickson, Cranford, and Roger J. Tull, Plainfield, N.J., assignors to Merck & Co., Inc., Rahway, N.J., a corporation of New Jersey
No Drawing. Filed Dec. 12, 1962, Ser. No. 243,991
14 Claims. (Cl. 260—239.55)

This invention relates to steroid compounds and processes for preparing the same, and more particularly, this invention is concerned with $\Delta^{4,6}$-6-alkyl-3-one steroids of the pregnane series and methods for making these compounds. The invention also includes novel intermediates produced in the method described herein.

The $\Delta^{4,6}$-3-one-6-alkyl pregnane steroids compounds of the present invention have utility in the treatment of anti-inflammatory conditions; they are also particularly useful as intermediates in the synthesis of other steroid compounds which have a high anti-inflammatory activity.

These $\Delta^{4,6}$-6-alkyl-3-one pregnane steroids, subject of the present invention are represented by the following formula:

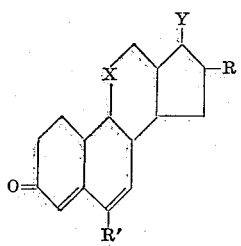

where R is hydrogen or lower alkyl and R' is lower alkyl, X is methylene, hydroxymethylene or carbonyl and Y is a dihydroxyacetone side chain protected as a bismethylenedioxy derivative.

The process of the present invention may be illustrated with reference to the following flow sheet in which R, R', X and Y are defined above, the wavy line indicates an alternative stereoisomeric configuration at that position and Z is a protected form of a ketone, such as dioxolane or bisalkoxy.

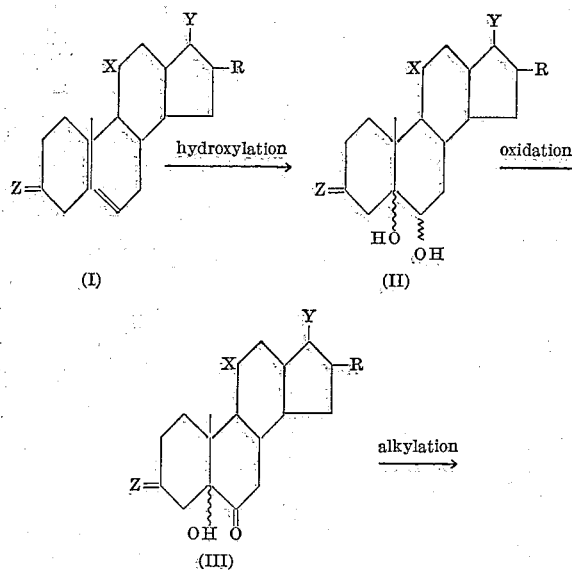

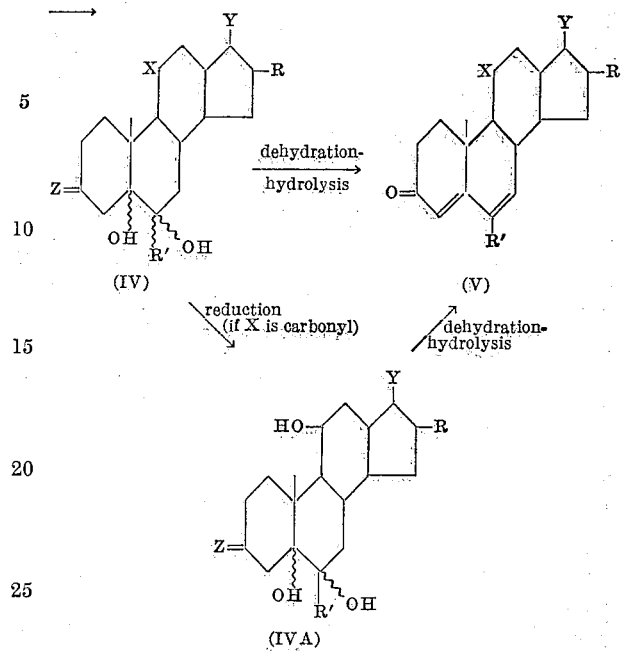

The starting materials employed in this process are $\Delta^4$-3-one pregnane steroids, preferably of the cortisone type, in which the 3-one group is protected from reaction by ketalization thereof. Preferably protection is afforded by ketalization with ethylene glycol to form the dioxolane derivative I, where Z is $$\begin{array}{l} CH_2O-\\ |\\ CH_2O- \end{array}$$

although other methods may be used as well, such as reaction with monohydric alcohols to form the dialkyl ketal. Thus, such compounds as the 3-ketal derivative of cortisone or hydrocortisone, or their 16-alkyl derivative may be employed as starting materials in the present process. Other existing pregnane side chains may have attached thereto suitable protective groups to protect the oxygen functions which may be present. For example, the bismethylenedioxy (BMD) derivative may be used for such a purpose as well as the aforementioned dioxolane.

These $\Delta^5$-3-dioxolane pregnane steroid starting materials may be prepared by reacting the corresponding $\Delta^4$-3-one precursor with ethylene glycol in the presence of an acidic catalyst, such as p-toluenesulfonic acid. During the course of the ketalization the $\Delta^4$ double bond shifts to the $\Delta^5$ position.

Once the starting materials are obtained, the desired $\Delta^{4,6}$-6-alkyl-3-one pregnane steroids may be prepared by first hydroxylating the unsaturated bond at the five position thereof to produce the corresponding 5,6-diol containing intermediate II. This reaction is preferably carried out by reacting the starting compound with osmium tetroxide, in a suitable organic solvent. Preferably a basic solvent such as pyridine is used in order to prevent the ketal group from reverting to the ketone form. In a typical run, I in dry pyridine is added with cooling and stirring to a solution of osmium tetroxide in pyridine at room temperature. Then the solution is stirred at that temperature for about three hours and allowed to stand for about two days. Thereupon the 5,6-diol II is recovered from the reaction mixture by suitable extraction and evaporation. The crude product is a mixture of the cis $\alpha$ and $\beta$ isomers, which is usable in the next step without further purification.

The next step in the method of the present invention is an oxidation of the 6-ol group of the above prepared 5,6-diol to form the corresponding 5-ol-6-one steroid III. Oxidizing agents in neutral or alkaline medium may be used for this purpose. Chromic oxide in pyridine is quite suitable.

Treatment of III with an alkyl Grignard reagent results in an alkylation of the 6-one group of III to provide the corresponding 5,6-diol-6-alkyl steroid intermediate IV. Typically reaction with methyl magnesium bromide affords the 6-methyl derivative in high yields.

At this point in the method sequence, two routes are possible. If the steroid intermediate IV contains an 11-one group, it is desirable to effect a reduction of this group to a 11β-ol group before proceeding further. For this purpose a reducing agent, such as sodium borohydride, may be used advantageously to form the 11β-ol intermediate IVA.

The final step in the method sequence of the present invention involves a dehydration of the tertiary carbinol groups at $C_5$ and $C_6$ intermediates of IV or IVA to form unsaturated bonds at $C_4$ and $C_6$. This step is effected by treatment of IV or IVA with dilute acid to provide the $\Delta^{4,6}$ compound V in nearly quantitative yields. During this step the 3-ketal group also hydrolyzes to the 3-one form. Mineral acids, such as hydrochloric, sulfuric, and the like and organic acids, such as formic, p-toluenesulfonic, and the like, may be utilized for this purpose. When it is desired to retain Y for subsequent reactions, a mineral acid should be used since it does not affect the Y group. The desired transformation in this step occurs in exceedingly high yields, in the order of 80% or more.

The following examples will illustrate the present invention in more detail.

*Example 1.—Preparation of starting material*

A stirred mixture of 2.08 g. (.005 mole) of 16α-methyl-cortisone-BMD, otherwise known by the chemical name "17α,20,20,21-bismethylenedioxy - 16α-methyl-4-pregnene-3,11-dione," 40 cc. ethylene glycol and 0.1 g. p-toluenesulfonic acid monohydrate is slowly distilled over a two hour period at a pressure of 6 mm. and vapor temperature of 79–83° C. The distillate volume is 20 cc. During the distillation 10 cc. of fresh ethylene glycol is gradually added. The cooled reaction mixture is treated with 6 drops of pyridine, added with stirring to 50 cc. cold 5% aqueous $NaHCO_3$ and further diluted with 100 cc. cold water (steroid precipitation). The alkaline aqueous mixture is extracted with benzene (4 x 30 cc.) and the benzene solution washed with water (2 x 30 cc.), dried over $Na_2SO_4$ and evaporated to dryness in vacuum. The yield of crude corresponds to the theoretically expected quantity (2.3 g.); M.P. 197–202°; U.V. ($CH_3OH$) λ max. 2480 E percent 27. The crude product is taken up in 230 cc. of ethyl ether, stirred with 23 g. of alumina (pH 8) for thirty minutes and filtered. The cake is washed with 3 x 60 cc. of ether. Evaporation of the ether solutions yields 2.04 g. (88.7%) of the dioxolane derivative of the 16α-methylcortisone-BMD, is otherwise known as the "3-ethylenedioxy" derivative of 16α-methylcortisone-BMD, M.P. 209–212°, U.V. ($CH_3OH$) shoulder at 2350 A., E percent 7.

*Example 2.—Hydroxylation*

A solution of 4.92 g. (0.0107 mole) of the dioxolane prepared above in 30 cc. of dry pyridine is added during ten minutes with cooling and stirring to a solution of 3.0 g. (0.0118 mole) of osmium tetroxide in 30 cc. of dry pyridine. After three hours of stirring at room temperature, the solution is stored at that temperature for two days. To the reaction solution is added with stirring and cooling a solution of 5.4 g. of sodium bisulfite in 120 cc. of water. The homogenous solution is stirred for two hours at room temperature and is then extracted with 6 x 75 cc. of chloroform. The pale yellow extract is washed with 3 x 100 cc. of water, dried over $Na_2SO_4$, and evaporated to dryness in vacuo. There is obtained 5.3 g. (quant.) of the 5,6-diol II. This total crude is used in the next step without purification. The chemical name is 3-ethylenedioxy-17α,20,20,21-bismethylene dioxy-16α-methyl pregnane-5-ol-6,11-dione.

*Example 3.—Oxidation*

Chromium trioxide (5.35 g.; 0.0535 mole) is added slowly with stirring and cooling to 53 cc. of dry pyridine. The resulting solution is added over fifteen minutes with stirring and cooling to a solution of crude diol, prepared above (5.3 g.; 0.0107 mole) in 53 cc. of dry pyridine. The mixture is stirred overnight at room temperature and then added with stirring to 1 l. of ice water. The product is extracted with 4 x 250 cc. of chloroform and the extract washed with water (3 x 300 cc.), dried over $Na_2SO_4$ and evaporated to dryness in vacuo. The crude ketol is dissolved in 100 cc. of 10% methanol in ethyl ether and stirred with 50 g. of alumina (pH 8) for thirty minutes. The alumina is filtered off and washed with 3 x 30 cc. of the same solvent. Evaporation to dryness gives 4.45 g. (84.5% from dioxolane) of mixed ketols III, which are used in the step of Example 4. The chemical name of the product is 3-ethylenedioxy-17α,20,20,21-bismethylenedioxy-16α-methyl-pregnane-5-ol-6,11-dione.

*Example 4.—Alkylation*

To a solution of 4.0 g. (0.00814 mole) of the mixed ketol prepared in Example 3 in 125 cc. of dry tetrahydrofuran is added during twenty-minutes at 25–30° under nitrogen 8.4 cc. of 2.9 N (0.0244 mole) commercial ethereal $CH_3MgBr$. Stirring is continued at room temperature for six hours. Aqueous saturated ammonium chloride solution (25 cc.) is added to the reaction solution. The mixture is diluted with 300 cc. of ice-water, and is extracted with 5 x 60 cc. of chloroform. The extract is dried over $Na_2SO_4$ and is evaporated to dryness in vacuo. The residue is triturated with 5 cc. of methanol (crystallization) and re-evaporated to produce the corresponding 6-hydroxy-6-methyl intermediate IV, which has the chemical name, 3-ethylenedioxy-17α,20,20,21 - bismethylenedioxy-6,16α-dimethyl pregnane-5,6-diol-11-one.

*Example 5.—Reduction*

A solution of sodium borohydride is prepared by slow addition of 6.6 g. (0.174 mole) of $NaBH_4$ to 50 cc. of water with stirring and cooling. This solution is added during a fifteen minute period at 20° under nitrogen to a solution of 3.3 g. (0.0065 mole) of crude 6-hydroxy-6-methyl intermediate of Example 4 in 100 cc. of tetrahydrofuran. After stirring overnight at room temperature, the reaction solution is cooled and treated dropwise (frothing) with a cold saturated aqueous solution of $NaH_2PO_4$ (41 g. in 55 cc. of water). The reaction mixture is stirred for thirty minutes at room temperature, diluted with 200 cc. of water and then extracted with 5 x 60 cc. of chloroform. The extract is washed once with water, dried over $Na_2SO_4$ and evaporated to dryness in vacuo. There is obtained 3.3 g. (quant.) of crude 11-β-hydroxy derivative IVA. The chemical name is 3-ethylenedioxy-17α,20,20,21-bismethylenedioxy-6,16α - dimethyl pregnane - 5,6,11β-triol.

*Example 6.—Dehydration—Hydrolysis*

The intermediate from Ex. 5 (255 mg.; 0.0005 mole) is dissolved in 15 cc. of methanol containing 0.135 cc. of concentrated aqueous hydrochloric acid. The solution is heated at reflux under nitrogen for one hour. The product starts to crystallize out after the first five minutes. After cooling, the reaction mixture is neutralized by addition of cold 5% aqueous $NaHCO_3$ solution and evaporated to dryness in vacuo. The residue is dissolved in 25 cc. of chloroform, washed with 2 x 8 cc. of water, dried over $Na_2SO_4$ and evaporated in vacuo. The crude product weighs 265 mg., M.P. 268–273° and shows λ max. 290 mμ, E percent 438. The crude product is washed on the funnel with 2 x 1 cc. of cold methanol and was air dried to constant weight. There is obtained 240 mg. (90.5%) of white crystalline material V having the formula: Δ⁴,⁶-17α,20,20,21-bismethylenedioxy-6,16α-dimethyl-pregnane 11β-ol-3-one; M.P. 288–290°;

U.V. $_{max.}^{MeOH}$ 290 mµ ,E percent 528 (previously reported E percent 532)

I.R. conforms to reference spectrum.

Example 7

When the process above is repeated using the cortisone derivative (I, R=H) as the starting material, the corresponding pregnanes are produced.

Example 8

When the process of Examples 1–4 and 6 is repeated using substituted cortisone and 16α-methyl cortisone (I, X is methylene and hydroxymethylene), the corresponding pregnanes are produced.

What is claimed is:

1. A compound selected from the group which consists of steroids of the pregnane series having the formula:

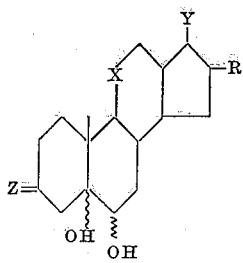

where R is selected from the group consisting of hydrogen and lower alkyl, X is selected from the group consisting of methylene, hydroxymethylene and carbonyl, Y is a dihydroxy acetone side chain protected as a bismethylenedioxy derivative and Z is selected from the group consisting of dioxolane and bisalkoxy.

2. A compound selected from the group which consists of steroids of the pregnane series having the formula:

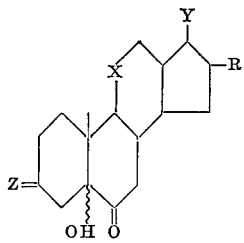

where R is selected from the group consisting of hydrogen and lower alkyl, X is selected from the group consisting of methylene, hydroxymethylene and carbonyl, Y is a dihydroxyacetone side chain protected as a bismethylenedioxy derivative, and Z is selected from the group consisting of dioxolane and bisalkoxy.

3. A compound selected from the group which consists of steroids of the pregnane series having the formula:

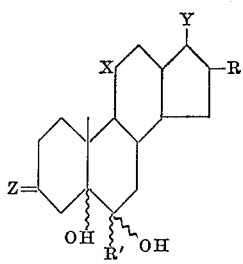

where R' is lower alkyl and R is selected from the group consisting of hydrogen and lower alkyl, X is selected from the group consisting of methylene, hydroxymethyl-ene and carbonyl, Y is a dihydroxyacetone side chain protected as a bismethylenedioxy derivative, and Z is selected from the group consisting of dioxolane and bisalkoxy.

4. A compound selected from the group which consists of steroids of the pregnane series having the formula:

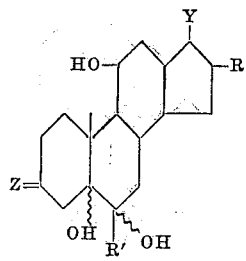

where R' is lower alkyl, R is selected from the group consisting of hydrogen and lower alkyl, Y is a dihydroxyacetone side chain protected as a bismethylenedioxy derivative, and Z is selected from the group consisting of dioxolane and bisalkoxy.

5. 3 - ethylenedioxy - 17α,20,20,21 - bismethylenedioxy-16α-methyl-pregnane 5,6-diol-11-one 6. 3 - ethylenedioxy - 17α,20,20,21 - bismethylenedioxy-16α-methyl-pregnane-5-ol-6,11-dione.

7. 3 - ethylenedioxy - 17α,20,20,21 - bismethylenedioxy-6,16α-dimethyl-pregnane-5,6-diol-11-one.

8. 3 - ethylenedioxy - 17α,20,20,21 - bismethylenedioxy-6,16α-dimethyl-pregnane 5,6,11β-triol.

9. A method for making Δ⁴,⁶-3-one-6-alkyl steroids of the pregnane series which comprises reacting osmium tetroxide with a Δ⁵-3-ketal steroid of the pregnane series having the formula:

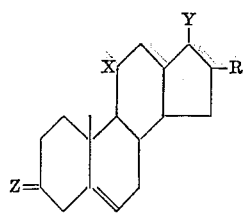

where R, X, Y and Z are as defined in claim 1, to form the corresponding 5,6-diol, reacting said 5,6-diol with an agent characterized as oxidizing secondary alcohols to ketones to form the corresponding 5-ol-6-one, reacting the latter compound with an alkyl Grignard reagent to form the 5,6-diol-6-alkyl intermediate and reacting said 5,6-diol-6-alkyl intermediate with a mineral acid thereby dehydrating and hydrolyzing said intermediate to form the desired steroid compounds.

10. A method for making Δ⁴,⁶-3-one-6-alkyl steroids of the pregnane series which comprises reacting osmium tetroxide with a Δ⁵-3-dioxolane steroid of the pregnane series having the formula:

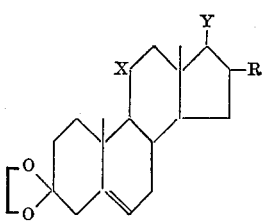

where R, X, and Y are as defined in claim 1, to form the corresponding 5,6-diol, reacting said 5,6-diol with an agent characterized as oxidizing secondary alcohols to ketones to form the corresponding 5-ol-6-one, reacting the latter compound with an alkyl Grignard reagent to form the 5,6-diol-6-alkyl intermediate, and reacting said 5,6-diol-6-alkyl intermediate with a mineral acid thereby dehydrating and hydrolyzing said intermediate to form the desired steroid compounds.

11. A method for making $\Delta^{4,6}$-3-one-6-alkyl-11$\beta$-ol steroids of the pregnane series which comprises reacting osmium tetroxide with a $\Delta^5$-3-ketal-11-one steroid of the pregnane series having the formula:

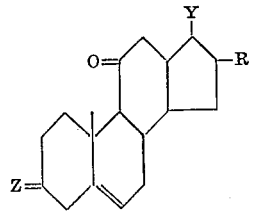

where R, Y and Z are defined in claim 1, to form the corresponding 5,6-diol, reacting said 5,6-diol with an agent characterized as oxidizing secondary alcohols to ketones to form the corresponding 5-ol-6-one, reacting the latter compound with an alkyl Grignard reagent to form the 5,6-diol-6-alkyl intermediate, reducing said intermediate to form the corresponding 11$\beta$-ol-intermediate, and reacting said 11$\beta$-ol intermediate with a mineral acid thereby dehydrating and hydrolyzing said intermediate to form the desired steroid compounds.

12. A method for making $\Delta^{4,6}$-3-one-6-alkyl-11$\beta$-ol steroids of the pregnane series which comprises reacting osmium tetroxide with a $\Delta^5$-3-dioxolane-11-one steroid of the pregnane series having the formula:

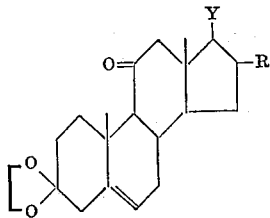

where Y is as defined in claim 1, to form the corresponding 5,6-diol, reacting said 5,6-diol with an agent characterized as oxidizing secondary alcohols to ketones to form the corresponding 5-ol-6-one, reacting the latter compound with an alkyl Grignard reagent to form the 5,6-diol-6-alkyl, reducing to form the corresponding 11$\beta$-ol intermediate and reacting said 11$\beta$-ol intermediate with a mineral acid thereby dehydrating and hydrolyzing said intermediate to form the desired steroid compound.

13. The process which comprises hydroxylating the 3-ethylenedioxy derivative of 16$\alpha$-methyl-cortisone-bis-methylenedioxy with osmium tetroxide to form 3-ethylenedioxy-17$\alpha$-20,20,21-bismethylenedioxy-16$\alpha$-methyl pregnane-5,6-diol-11-one, oxidizing with chromic acid in pyridine to form the 5-ol-6,11-dione, alkylating with methyl magnesium bromide to form 3-ethylenedioxy-17$\alpha$,20,20,21-bismethylenedioxy-6,16$\alpha$-dimethyl pregnane-5,6-diol-11-one, reducing with sodium borohydride to form 3-ethylenedioxy-17$\alpha$,20,20,21-bismethylenedioxy 6,16$\alpha$-dimethyl pregnane-5,6,11$\beta$-triol, and then simultaneously dehydrating and hydrolyzing with acid to form the desired intermediate $\Delta^{4,6}$-17$\alpha$-20,20,21-bismethylenedioxy-6,16$\alpha$-dimethyl-pregnane-11$\beta$-ol-3-one.

14. The process which comprises simultaneously dehydrating 3-ethylenedioxy-17$\alpha$,20,20,21-bismethylenedioxy-6,16$\alpha$-dimethyl pregnane-5,6-11$\beta$-triol in acid solution to form $\Delta^{4,6}$-17$\alpha$,20,20,21-bismethylenedioxy 6,16$\alpha$-dimethyl-pregnane-11$\beta$-ol-3-one.

References Cited by the Examiner

UNITED STATES PATENTS 3,021,327 2/1962 Beal et al. _____ 260—239.55
3,079,382 2/1963 Camerino et al. ____ 260—239.55

LEWIS GOTTS, *Primary Examiner.*